(12) United States Patent
Filippi

(10) Patent No.: US 6,467,758 B1
(45) Date of Patent: Oct. 22, 2002

(54) PROCESS FOR EFFECTING MASS TRANSFER BETWEEN A LIQUID PHASE AND A GASEOUS PHASE

(75) Inventor: Ermanno Filippi, Castagnola (CH)

(73) Assignee: Ammonia Casale SA, Lugano Besso (CH)

( * ) Notice: Subject to any disclaimer, the term of this patent is extended or adjusted under 35 U.S.C. 154(b) by 0 days.

(21) Appl. No.: 09/645,313

(22) Filed: Aug. 25, 2000

(51) Int. Cl.[7] ................................................ B01F 3/04
(52) U.S. Cl. ........................... 261/128; 261/94; 261/96; 261/148; 95/211; 95/221
(58) Field of Search ............................ 261/94, 96, 128, 261/136, 148, 149; 96/290, 294, 296, FOR 112, FOR 123; 95/211, 221, 227, 228

(56) References Cited

U.S. PATENT DOCUMENTS

| | | | | |
|---|---|---|---|---|
| 1,085,366 A | * | 1/1914 | Stuart ........................... | 261/96 |
| 1,798,307 A | * | 3/1931 | Cooper ......................... | 261/96 |
| 2,332,224 A | * | 10/1943 | Heath et al. ................... | 261/94 |
| 2,475,855 A | | 7/1949 | Peters | |
| 3,445,343 A | * | 5/1969 | Popov ......................... | 261/148 |
| 3,759,496 A | * | 9/1973 | Teller ........................... | 261/94 |
| 4,177,044 A | * | 12/1979 | Jernqvist ..................... | 261/149 |
| 4,256,674 A | | 3/1981 | Shafranovsky et al. | |
| 4,307,063 A | * | 12/1981 | O'Brien ....................... | 261/94 |

FOREIGN PATENT DOCUMENTS

EP 0 386 692 9/1990

* cited by examiner

Primary Examiner—C. Scott Bushey
(74) Attorney, Agent, or Firm—Sughrue Mion, PLLC (57) ABSTRACT

A process for effecting mass transfer between liquid phase and a gaseous phase in a filled-type column having an external shell which accommodates at least one filler-containing basket wherethrough the phases are caused to flow in countercurrent relationship. The process advantageously includes the step of feeding the gaseous phase to the at least one basket through a gas-permeable surface thereof which is larger than the basket cross-section, preferably in a prevailing radial flow direction.

7 Claims, 3 Drawing Sheets

PROCESS FOR EFFECTING MASS TRANSFER BETWEEN A LIQUID PHASE AND A GASEOUS PHASE

DESCRIPTION

1. Field of the Invention

This invention relates to a process for effecting mass transfer between a liquid phase and a gaseous phase in a filled-type column wherethrough said phases are caused to flow in a countercurrent relationship.

In the description given below and in the following claims, the term: "filled-type column", is understood to mean—in general—an apparatus having, disposed on its interior, a plurality of variously shaped and sized elements (filler) at whose surfaces a liquid phase and a gaseous phase are caused to contact each other in order to effect mass transfer; apparatus of this type are widely employed in chemical plants, e.g. for decomposing, absorbing, distilling, and scrubbing chemicals.

The invention also relates to a filled-type column for implementing the above process, and to a method of retrofitting a pre-existing column for conversion into a filled-type column according to the invention.

In the description given below and in the following claims, the term: "retrofitting", is understood to mean the in-situ modification of a pre-existing column of the filled or plates type to improve its performance and, for example, to increase its capacity and/or its efficiency in mass transfer between the liquid phase and the gas phase, as well as to reduce its energy consumption.

As is known, in the field there is increasingly felt the need of providing processes easy to implement, which can effect mass transfer between a liquid phase and a gaseous phase in a simple and efficient way, at low investment and operating costs and with a low energy consumption.

2. Prior Art

In order to meet the above requirement, processes for effecting mass transfer have been proposed in the field wherein a liquid phase and a gaseous phase are caused to flow through a filled-type column in a downward and an upward (substantially axial) direction, respectively.

While being simple to implement, such prior processes are beset with problems arising mainly from the large pressure drop experienced by the gas phase in going through the filler.

The filler is, in fact, disposed inside substantially cylindrical columns having a large height-to-diameter ratio intended to ensure an interphase contact of sufficient duration for the phases to enhance the mass transfer.

Consequently, in flowing through the filler, the gas phase undergoes a significant reduction in pressure (pressure drop), which places limitations on the amount of gas that can be fed into the column, thus curtailing the column capacity.

By reason of this pressure drop, the flow rate of the gas phase fed into the column must be held below predetermined values, the overtaking of which would result in the appearance of an undesirable "flooding" phenomenon, whereby the column becomes flooded with liquid phase which is held back in its downward movement by frictional drag from the gas phase. It will be appreciated that in this condition the column would no longer be operable, due to the mass transfer dropping to virtually nil.

In other words, the large pressure drop of the gaseous phase in going through the filler is a limiting factor of the gas phase flow rate through the column designed to implement the above prior art processes, and hinders an effective mass transfer between the phases.

To counteract the pressure drop in the gaseous phase, and thus to increase the capacity of filled-type columns according to the prior art, some special fillers having a high void ratio have been proposed, wherethrough the gaseous phase stream undergoes no large pressure drops.

While such fillers allow the flow rate of the gas phase being fed into the column to be increased somewhat, they have been unsuccessful in providing a fully satisfactory mass transfer between the phases, because the pressure drop of the gas phase through the column is still quite significant, as are the operational constraints due to the aforementioned flooding phenomenon.

Columns of the so-called plates type, i.e. provided with a plurality of perforated plates fitted horizontally inside the column, have been proposed alternatively to the filled-type columns.

In this case, the process for effecting mass transfer between the liquid and gaseous phases comprises mixing the phases together in the plates, the plates being typically designed to enhance the mutual contact of the phases. Plates-type columns have been found suitable for low liquid flow-rate applications, but are liable to become flooded, disallowing any further effective mass transfer between the liquid and gas phases.

It is on account of the above disadvantages that prior art processes for effecting mass transfer between a liquid phase and a gaseous phase have provided unsatisfactory performance heretofore, both in terms of overall efficiency of the transfer between the phases, energy consumption, and operating and investment costs of the columns used to implement such processes (which are, as said before, beset with several limitations).

All this, despite this technology having been utilized in a variety of chemical applications for years and the aforementioned need being increasingly felt in the field.

SUMMARY OF THE INVENTION

The problem underlying the present invention is that of providing a process for effecting mass transfer between a liquid phase and a gaseous phase, which process affords a highly efficient transfer between the phases in a simple and effective way, at low investment and operating costs and with low energy consumption.

This problem is solved, according to the invention, by a process as indicated above for effecting mass transfer between a liquid phase and a gaseous phase within a filled-type column which comprises an external shell accommodating at least one filler-containing basket wherethrough said phases are caused to flow in countercurrent, which process is characterized in that it comprises the step of feeding said gaseous phase to said at least one basket through a gas-permeable basket surface which is larger than the basket cross-section.

In this way, by causing the gaseous phase to flow through a permeation surface of said at least one basket which is advantageously made larger than the basket cross-section, a corresponding reduction is obtained in the pressure drop of said phase flowing through the filler, which allows the gas flow rate to be increased and—at the same time—to operate at slower velocities than prior art processes, thereby significantly enhancing the mass transfer between the phases.

The benefits in terms of improved efficiency of mass transfer are the more substantial, the larger the permeation surface presented to the gaseous phase.

In this respect, the above problem is solved, in a particular effective way, by a process for effecting mass transfer between a liquid phase and a gaseous phase within a filled-type column which comprises an external shell accommodating at least one filler-containing basket whose cross-section is smaller than the cross-section of said shell, said process comprising the steps of:

feeding said liquid phase and gaseous phase into said filled-type column;

causing the liquid phase to flow through said at least one basket in a substantially axial direction;

causing the gaseous phase to flow through said at least one basket in a prevailing radial direction;

extracting said liquid phase and gaseous phase from said filled-type column.

With the process of this invention, and particularly by causing the gaseous phase to flow through the filler in a prevailing radial direction—rather than in an axial direction as taught by prior art processes—the permeation or passage surface can be drastically expanded to positively enhance in a simple and effective way the mass transfer between the phases and, hence, to significantly increase the capacity of the column designed to implement such a process over a column of comparable size operating according the aforementioned prior art processes.

Stated otherwise, for a given capacity, the column implementing the process of this invention can by made substantially smaller than a prior art column.

This arises mainly from that the pressure drop undergone by the gas phase in flowing radially through the filler can be considered trivial compared to the pressure drop involved in going through the filler in the axial direction, so that the process of this invention can advantageously be carried out at higher gas flow rates than in the prior art, before such undesirable phenomena as flooding occur, thereby enhancing the mass transfer between the liquid and the gaseous phase.

In particular, the process of this invention can virtually eliminate—in an extremely simple and effective way—the constraints of pressure drop and limited flow-rate of the gas phase through the column, allowing to operate at desired volumes and velocities of the gas and liquid flows for optimum utilization of the exchange surface area of the filler for effecting mass transfer.

Advantageously, thanks to this process, a highly efficient mass transfer between the phases can now be achieved using a filled-type column which performs most efficiently, and involves low investment and operating costs and at low energy consumption.

The fact that the mass transfer between the phases can be significantly improved by flowing the gas phase in a prevailing radial direction through the filler, is in sharp contradiction with the constant prior art teaching that a crossflow of the gaseous phase relative to the liquid phase is less advantageous, from the standpoint of the mass transfer, than an axial flow of the phases in true countercurrent relationship.

In addition, since the conditions and the chemical/physical processes which are responsible for the mass transfer between the phases can vary substantially with the flow type, the benefits of the process according to the present invention were not at all predictable a priori.

It was only the research work carried out by the Applicant that unexpectedly brought out how, by having the gaseous phase flow in a prevailing radial direction, in countercurrent to the substantially axial flow of the liquid phase, the driving force responsible for the mass transfer between the phases could act much more efficiently than in a true countercurrent flow, and thus the effectiveness and intensity of the mass transfer could be advantageously augmented.

Particularly satisfactory results have been obtained by causing the gas phase to flow through said at least one basket in substantially radial, substantially axial-radial, or substantially crosswise directions.

Preferably, the prevailing radial flow of the gaseous phase through said at least one basket is of an either centrifugal, or centripetal, or alternating centrifugal and centripetal type.

In a particularly advantageous embodiment of the invention, the liquid phase and the gas phase are caused to flow in said at least one basket through a plurality of contiguously superimposed zones, with the liquid phase and the gas phase being fed to an upper zone and a lower zone, respectively, of said at least one basket, and extracted from a lower zone and an upper zone thereof, respectively.

By dividing the filler into a plurality of zones to be traversed by the gas phase in a prevailing radial direction, it has been obtained an increase in the radial component of the gas flow, with the consequence that it is possible to further augment the flow rate of the gas phase and thus improve the mass transfer between the phases and with them, the capacity of the column used to implement this process.

Alternatively, the same result can be obtained by causing the liquid phase and gas phase to flow in a substantially axial, respectively prevailing radial direction through a plurality of superimposed filler-containing baskets.

Advantageously, according to the last-mentioned embodiment, the process according to the invention further comprises the step of:

collecting and re-distributing said liquid phase between successive baskets.

In this way, it is possible to maintain the whole filler constantly swept by the liquid phase, thus avoiding the latter from flowing down along preferential paths which swept only local zones of the filler, resulting in a much reduced effective surface area being available for the mass transfer.

Preferably, the gas phase is caused to flow radially through contiguous zones of said at least one basket or through successive baskets, in opposite directions, thereby to provide a zigzag flowpath for the gas phase within the column, which proves advantageous from the constructional standpoint.

For implementing the above process, the invention advantageously provides a filled-type column for effecting mass transfer between a liquid phase and a gaseous phase, which comprises:

an external shell;

at least one basket for containing the filler extending inside said shell, said at least one basket being through-penetrated by said phases in countercurrent relationship;

respective means for feeding said liquid phase and said gaseous phase into said column;

respective means for extracting said liquid phase and said gaseous phase from said column; the column being characterized in that said at least one basket is provided with a gas-permeable surface, for passing the gaseous phase, which is larger than its cross-section.

Preferably, the column according to the invention is characterized in that said at least one basket has a smaller cross-section than the shell cross-section and has opposite sidewalls which are gas-permeable, and in that it further comprises means for causing said gaseous phase to flow through said at least one basket in a prevailing radial flow.

According to a preferred embodiment, the column advantageously comprises:

an external shell, substantially cylindrical in shape;

at least one annular basket for containing the filler which is disposed coaxially within said shell and includes opposite respectively inner and outer gas-permeable cylindrical walls, said at least one basket being through-penetrated by said liquid phase in a substantially axial flow direction;

a first free space defined between an inner wall of the shell and said outer wall of the basket;

a second free space defined inwardly of said inner wall of the basket;

respective means for feeding said liquid phase and said gaseous phase into said column;

means for causing at least a major portion of said gaseous phase to flow through said at least one basket, from said first free space to said second free space, or the other way round;

respective means for extracting said liquid phase and said gaseous phase from said column.

According to a further preferred embodiment, the column advantageously comprises:

an external shell;

at least one basket for containing the filler, disposed inside said shell coaxially therewith and provided with opposite sidewalls, preferably plane, which are gas-permeable, said at least one basket being through-penetrated by said liquid phase in a substantially axial flow direction;

first and second free spaces, located opposite to each other and defined between an inner wall of said shell and said sidewalls of the basket;

respective means for feeding said liquid phase and said gaseous phase into said column;

means for causing at least a major portion of said gaseous phase to flow through said at least one basket, from said first free space to said second free space or the other way round;

respective means for extracting said liquid phase and said gaseous phase from said column.

According to a further aspect, the invention provides a method of retrofitting a column for effecting mass transfer between a liquid phase and a gaseous phase, being of either the filled or the plates type, which method is characterized in that it comprises the step of:

providing, inside said column, at least one basket for containing a filler and having a gas-permeable surface, for passing the gaseous phase, which is larger than its cross-section.

Thanks to the above method of retrofitting an existing column, a process for effecting mass transfer between a liquid phase and a gaseous phase can be obtained which allows to provide a high rate of transfer between the S phases in a simple and effective manner, at low investment and operating costs, and with low energy consumption.

Further features and advantages of this invention will become apparent from the following description of an embodiment of the process according to the invention, given by way of non-limitative example with reference to the accompanying drawings.

DETAILED DESCRIPTION OF A PREFERRED EMBODIMENT

Referring to FIGS. 1–6, generally shown at 1 is a filled-type column for effecting mass transfer between a liquid phase and a gaseous phase, according to the invention.

The column 1 comprises an external shell 2, at least one basket 3 extended inside the shell 2 to receive a filler 4, respective means 5 and 6 for feeding a liquid phase and a gaseous phase into the column 1, and respective means 7 and 8 for extracting the liquid phase and gaseous phase from the column 1.

Means 5 and 7 for feeding, respectively extracting, the liquid phase to/from the column 1 generally comprise conduits, nozzle-type dispensers or collecting chambers of known types to the person skilled in the art, and accordingly, no further discussed in detail herein.

Similarly, means 6 and 8 for feeding, respectively extracting, the gaseous phase to/from the column 1 generally comprise gas inlets and outlets of known types to the person skilled in the art, and accordingly, no further discussed in detail herein.

Figures 1, 2:
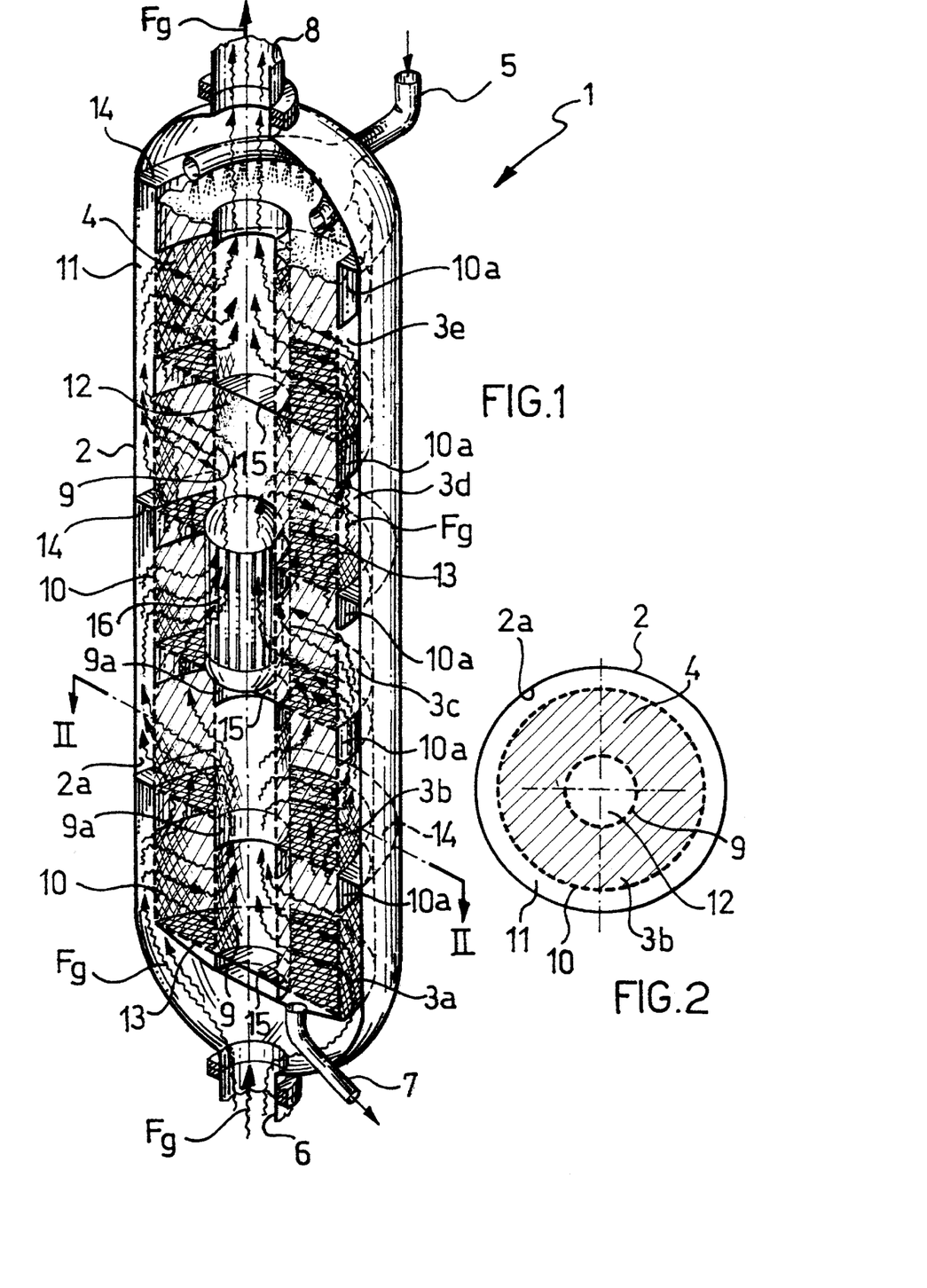
FIG. 1 is a longitudinal section view of a first embodiment of a filled-type column, as constructed either from an original design or by modifying a traditional column, to implement the process according to the invention.
FIG. 2 is a longitudinal section view of the column shown in FIG. 1, taken along line II—II in FIG. 1.
Figures 3, 4:
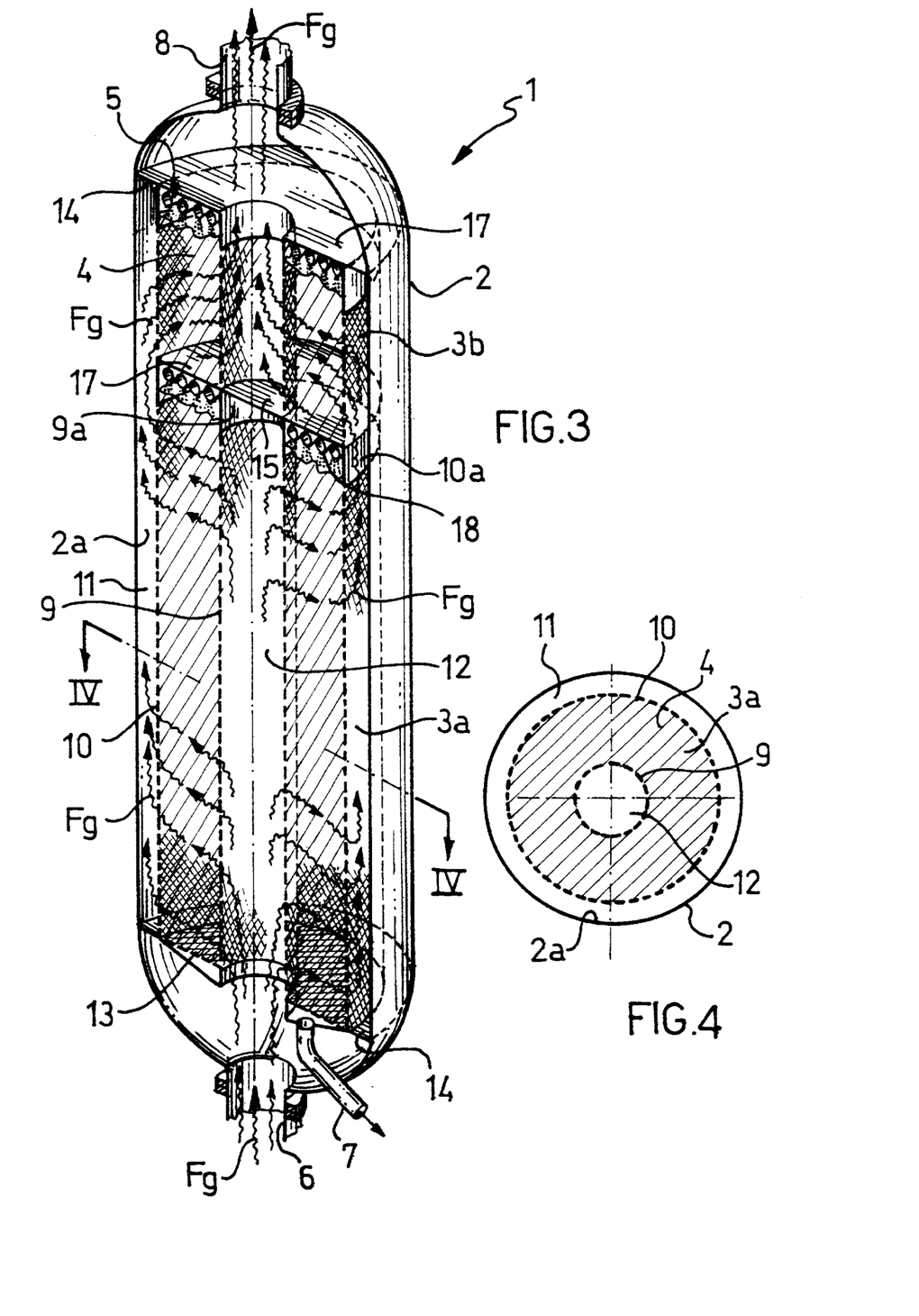
FIG. 3 is a longitudinal section view of a second embodiment of a filled-type column, as constructed either from an original design or by modifying a traditional column, to implement the process according to the invention.
FIG. 4 is a longitudinal section view of the column shown in FIG. 3, taken along line IV—IV in FIG. 3.
Figures 5, 6:
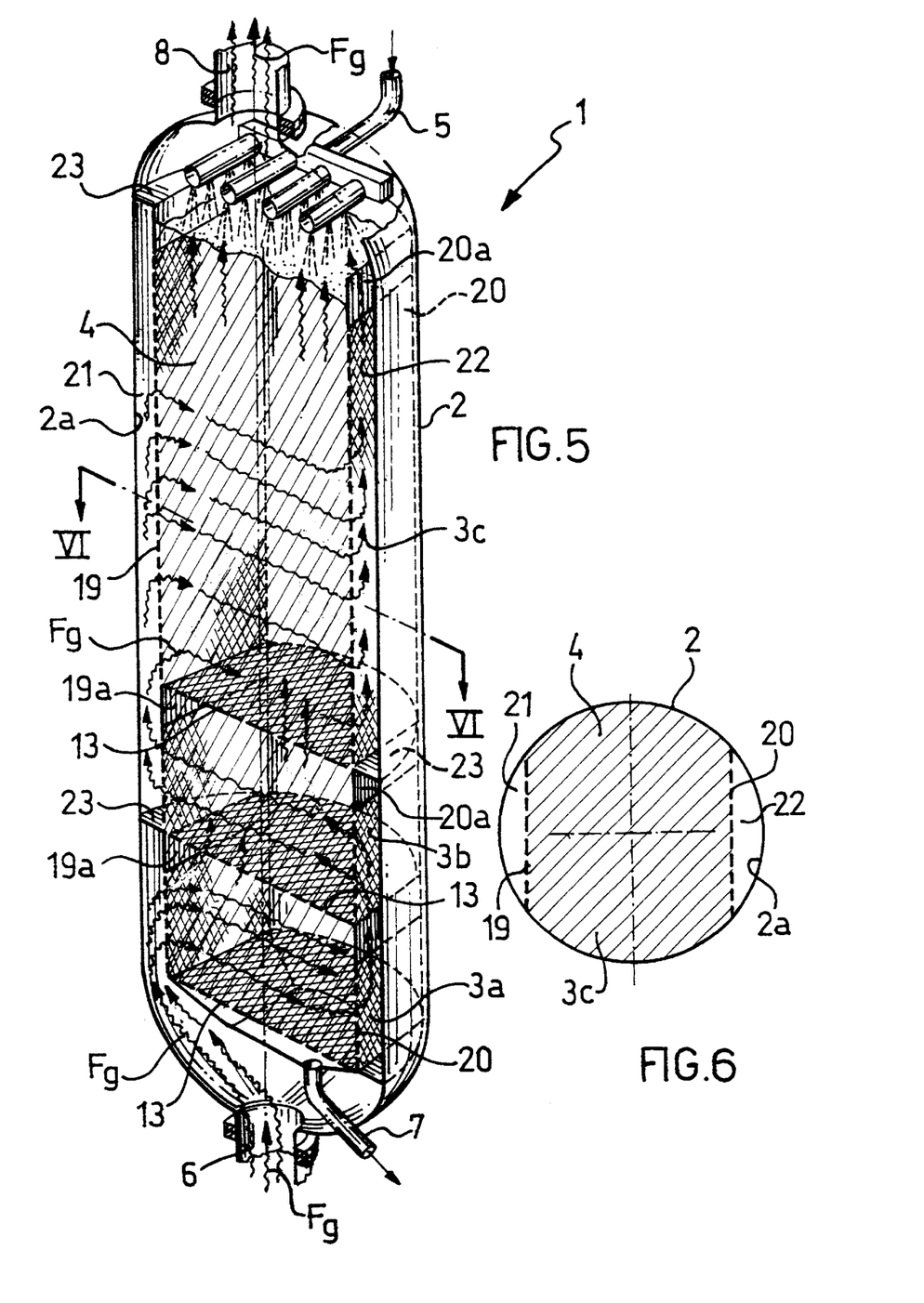
FIG. 5 is a longitudinal section view of a third embodiment of a filled-type column, as constructed either from an original design or by modifying a traditional column, to implement the process according to the invention.
FIG. 6 is a longitudinal section view of the column shown in FIG. 5, taken along line VI—VI in FIG. 5.

In the examples of FIGS. 1, 3 and 5, the liquid phase is fed by the means 5 to a top end of the column 1, and is extracted by the means 7 from a bottom end thereof. Thus, the liquid phase will flow through the column 1 in a manner known per se, i.e. in a substantially axial direction.

The gaseous phase is fed by the means 6 to a bottom end of the column 1 and extracted from a top end thereof by the means 8.

The liquid phase and gaseous phase could, however, be fed in and extracted at intermediate locations on the column 1, as is usually done in traditional filled-type columns.

In other words, means for feeding, respectively extracting, the liquid phase and/or the gaseous phase may be provided anywhere along the shell 2, in order to maintain constant operational conditions within the column or to improve the mass transfer between the phases.

According to the present invention, said at least one basket 3 is advantageously provided with a gas-permeable surface for the passage of the gas phase through the filler 4, which is larger than its cross-section.

For the purpose, the basket 3 is given a smaller cross-section than the cross-section of the shell 2, and has opposite sidewalls 9 and 10 which are gas-permeable.

In addition, the column 1 advantageously includes appropriate means, to be described, adapted to cause the gas phase to flow through the basket 3 in a prevailing radial direction.

In this way, the gas phase is caused to flow through the column 1—contrary to the constant teaching of the prior art—in countercurrent to the liquid phase along a prevailing radial flow direction.

The gas-permeable surface of the sidewalls 9 and 10 is advantageously provided larger than the cross-section of the basket 3.

According to the embodiment shown in FIG. 1, the filled-type column 1 of this invention comprises an external shell 2 which is substantially cylindrical in shape, and at least one annular basket 3a–3e for containing the filler 4 which is mounted inside the shell 2 coaxially therewith and has opposite gas-permeable cylindrical inner and outer walls, 9 and 10 respectively.

A first free space 11 is formed between an inner wall 2a of the shell and the outer wall 10 of the basket, and a second free space 12 is formed within the inner wall 9 of the basket.

Advantageously, the column 1 further comprises means 9a, 10a, 14, 15, for causing at least a major portion of the gas phase to flow through said at least one basket 3a–3e, from the first free space 11 to the second free space 12 or the other way round.

In the example of FIG. 1, the column 1 contains five annular baskets 3a–3e for containing the filler 4, which are superimposed and disposed coaxially within the shell 2.

These baskets are flown by the liquid phase from above downward of the column 1 with substantially axial direction, and by the gas phase from beneath upward with substantially axial-radial direction, as indicated by arrows Fg.

The number of baskets 3 inside the shell 2 may vary to suit the size of the column 1 and the rate of mass transfer sought. A number of baskets in the one to twenty range should prove adequate to meet most requirements.

To promote the mass transfer between the phases and ensure optimum operating conditions throughout the column 1, the baskets 3a–3e for containing the filler 4 may advantageously be provided in different lengths, e.g. with the lowermost basket 3a being the longest and the other baskets decreasing gradually in length to the uppermost basket 3e which would be the shortest.

The baskets 3a–3e shown in FIG. 1 are laid contiguously, and have each a perforated bottom 13 which can be permeated by both the liquid phase and the gaseous phase.

Advantageously, the perforated bottoms 13 of the baskets 3a–3e are suitably sized to deflect the gas phase radially and/or to collect and re-distribute the liquid phase between the baskets.

The presence of the perforated bottoms 13 between successive contiguous baskets 3a–3e produces a controlled increase of predetermined entity in pressure drop of the gas phase flowing through the basket which allows at least some of that phase to be deflected radially, and the outflowing liquid phase from one basket to be optionally collected and re-distributed to the next basket.

By having the liquid phase collected and re-distributed between successive baskets 3a–3e, optimum conditions can be ensured for the mass transfer between the phases, with the entire surface area of the filler 4 being utilized and preventing the formation of preferential flowpaths for the liquid phase going through the filler.

The portion of the gas phase which has been deflected radially out of one basket 3a–3d is then re-introduced into the next basket 3b–3e, again in radial flow direction.

Preferably, the radial flow of the gas phase through the baskets 3a–3e is either of centrifugal or centripetal type.

Particularly satisfactory results have been obtained using an alternating centripetal and centrifugal flow (or vice versa), as indicated by the arrows Fg in FIG. 1. That is, the gaseous phase goes radially through successive baskets 3a–3e in opposite directions.

The baskets 3a–3e, or just some of them, may be disposed inside the column 1 at suitable distances from one another to define respective cylindrical spaces between successive baskets.

These spaces may advantageously accommodate means (not shown) of collecting and re-distributing the liquid phase from one basket to the next, which means are conventional and no further described herein.

Alternatively to having a plurality of baskets, the column 1 according to the present invention could advantageously have a single basket 3 divided into a plurality of zones (indicated in FIG. 1 by the same references 3a–3e as the baskets), contiguous one above the other. This arrangement is to be regarded as substantially equivalent to the basket arrangement shown in FIG. 1.

According to this embodiment, no perforated bottoms 13 are provided, and the filler 4 inside the basket 3 forms a continuous single body.

According to a particularly advantageous aspect of the invention, the outer wall 10, or the inner wall 9, of at least one basket 3a–3e comprises a portion 10a, respectively 9a, which is gas-impermeable and of a predetermined length along a top end thereof.

In the example of FIG. 1, both the outer wall 10 and the inner wall 9 of each basket 3a –3c advantageously comprise the gas-impermeable portion 10a and 9a, respectively.

Where, instead of the baskets 3a–3c, the column 1 comprises a single basket 3 divided into a plurality of zones 3a–3c as described above, the gas-impermeable portions 9a and 10a of predetermined length of the inner wall 9 and/or of the outer wall 10, respectively, of the basket 3 would be defined along a top end of each zone.

By providing a gas-impermeable top portion on at least one of the, preferably both, sidewalls of the baskets or zones 3a–3c, a major portion of the gas phase stream flowing from bottom to top through the filler 4 can be deflected radially in a simple and effective manner, allowing the gas phase to flow through the column 1 in a prevailing radial direction.

In fact, the unperforated portion of the sidewalls 9 and/or 10 produces a controlled increase (of predetermined entity) in the pressure drop of the gas phase which advantageously impedes the axial flow through the filler 4, thereby deflecting the gas phase stream radially.

The proportion of the gas phase that goes radially, respectively axially, through the filler 4 is dictated by the lengths or extents of the gas-impermeable portions 9a and/or 10a, because the pressure drop undergone by the gas phase would vary correspondingly with such portions. By increasing the length of the gas-impermeable portion, the resistance to the axial flow and, hence, the radial flow component of the gas phase is increased.

As shown in FIG. 1, it is only a minor portion of the gas phase that goes through the filler 4 in a substantially axial flow, while the major portion thereof follows substantially radial flowpaths, resulting in a mixed flow being established, i.e. axial-radial.

Where both sidewalls 9 and 10 of the basket(s) 3a–3e include gas-impermeable portions 9a and 9b, the length of each portion may advantageously be different for the inner wall 9 and the outer wall 10, so as to augment or diminish the radial component of the gas phase flow.

Particularly satisfactory results have been obtained with the gas-impermeable portion 9a, 10a being 5% to 30% of the length of the inner wall 9 and/or outer wall 10 of the basket 3a–3e.

Preferably, the length of the gas-impermeable portion will be in the range of 10% to 25.

According to a further particularly advantageous aspect of this invention, the column 1 includes gas-impermeable means 14 and 15 for closing the free spaces 11 and 12 arranged at the first and at the second free space 11 and 12 respectively.

According to the example of FIG. 1, in at least one basket 3a–3e, these closure means advantageously comprise an annular baffle 14 which is gas-impermeable and disposed at a top end of the first free space 11, and a circular baffle 15 which is gas-impermeable and disposed at a bottom end of the second free space 12.

In this way, the gaseous phase can be caused to pass from one basket 3a–3d to the next basket 3b–3e in an alternating centripetal and centrifugal flow of prevailing radial direction, while preventing the gas phase from bypassing one or more of the baskets, which would adversely affect the overall efficiency of the mass transfer taking place between the phases.

In fact, when at least a major portion of the gas phase is caused to flow radially through the filler 4, it matters that the gas exiting a given basket be directed to the next basket in such a manner that it cannot flow out and sweep across other baskets in the column or even escape from the column.

Where the gaseous phase is to move from one basket 3a–3d to the next 3b–3e in a mainly radial flow of the alternating centrifugal and centripetal type, the gas-impermeable annular baffle 14 would be disposed at a bottom end of the first free space 11, and the gas-impermeable circular baffle 15 would be disposed at a top end of the second free space 12.

In the example of FIG. 1, with the column 1 being traversed by a substantially axial-radial flow of the gaseous phase, the baskets 3a–3e are left open at their top ends, rather than being closed by a gas-impermeable cover.

This greatly facilitates the axial traversing of the same by the liquid phase, and particularly in the upper basket 3e, facilitates the feeding and distributing of this phase on the filler 4 therein contained.

In FIG. 1, the numeral 16 generally indicates a heat exchanger disposed in the second free space 12 in the basket 3c, for subjecting the gaseous phase which leaves the basket 3c with radial flow and is directed to the next basket 3d, to an indirect heat exchange with a heating or cooling fluid, such as water.

In particular, the gaseous phase is caused to flow through the heat exchanger 16 on the shell side, with the heating or cooling fluid on the tube side. For simplicity, the means for feeding and extracting the heating or cooling fluid to/from the heat exchanger 16 have been omitted from FIG. 1 because known per se.

Depending on individual requirements, one or more heat exchangers 16 providing indirect heat exchange for at least some of the gaseous phase flowing between successive baskets 3a–3e may be arranged in the free space 12.

By providing a heat exchanger 16 in the column 1, the scrubbing, absorbing, distilling and decomposing processes for which the column is intended can all be improved.

As mentioned above, all the features, except the gas permeable bottom 13, described in relation to the baskets 3a–3e also apply to the particular embodiment, not shown, of this invention wherein the column i comprises a single basket 3 divided into a plurality of zones 3a–3e.

FIG. 3 shows an embodiment of a column 1 for implementing the process according to the present invention, which differs from the example of FIG. 1 mainly in that the gaseous phase is caused to flow through the filler 4 in a substantially radial direction, rather than axial-radial.

In this figure, the parts of the column 1 which are structurally and functionally equivalent to those shown in FIG. 1, carry the same reference numbers and will be not further described.

Advantageously, the gaseous phase is caused to flow in substantially radial direction by closing the top end of the basket(s) 3 loaded with the filler 4 disposed inside the column 1.

For the purpose, at least one basket 3 has a gas-impermeable cover 17 mounted at its top end.

In the example of FIG. 3, the baskets 3a and 3b are each provided with a cover 17 such that not even a minor portion of the gaseous phase will be allowed to go through the filler 4 in an axial flow direction.

Thanks to the gas-impermeable cover 17, the gaseous phase is forced to flow radially through the filler 4, and is prevented from exiting the baskets 3a–3b in an axial direction.

In this case, the gas-impermeable portion 9a, respectively 10a, of the inner and outer sidewalls 9 and 10 of the baskets 3a–3b, additionally to deflecting the gaseous phase flow in a radial direction, advantageously prevents the baskets 3a–3b from being undesirably bypassed by at least a portion of said phase which might leak, through any gap between the cover 17 and the filler 4, directly from the first free space to the second, 11 respectively 12, or the other way round, affecting the overall efficiency of the mass transfer between the phases.

Preferably, the gaseous phase will flow, as indicated by the arrows Fg in FIG. 3, radially outwards through the first basket 3a and radially inwards through the second basket 3b.

The radial direction of the gaseous phase may be selected to suit the column 1 construction, and may be purely centripetal or purely centrifugal, or centripetal and centrifugal (or vice versa). Similar to the example shown in FIG. 1, the advantages resulting by selecting a particular direction for the gaseous phase flow do concern the construction of the column 1, but are of trivial importance to the efficiency of the mass transfer between the phases.

Furthermore, a combined process could be provided with some of the baskets 3 being traversed by the gaseous phase in substantially radial flow direction, and some others in axial-radial direction.

In this case, not all of the baskets 3a–3b would be fitted with a gas-impermeable cover 17.

The number of baskets 3a–3b shown in FIG. 3 and their different lengths are merely illustrative, and may vary according to necessity as previously described in relation to FIG. 1.

It should be noted that the means 5 for feeding the liquid phase into the column 1 locates between the cover 17 of the upper basket 3b and the filler 4.

According to this embodiment, the liquid phase flowing out of the upper basket 3b is picked up—by means not shown because known per se—and re-distributed to the lower basket 3a, for example, by a nozzle type dispenser 18, itself disposed between a respective cover 17 and the filler 4.

Advantageously, the baskets 3a and 3b locate adjacent to each other, with the cover 17 of the lower basket 3a forming the gas-impermeable bottom of the upper basket 3b. A column of compact and simple construction is thus obtained. However, a plurality of baskets 3 spaced apart inside the column 1 could be provided instead.

Although not shown in FIG. 3, the free space 12 may advantageously accommodate one or more heat exchangers for an indirect heat exchange between the gaseous phase flowing from one basket to the next and a heating or cooling fluid, as described in relation to FIG. 1.

According to a further embodiment of this invention depicted in FIG. 5, the column 1 includes at least one basket 3a–3c for containing the filler 4 and being disposed coaxially within the shell 2 and having opposite sidewalls 19, 20 which are gas-permeable and preferably plane.

Defined between the inner wall 2a of the shell 2 and the sidewalls 19 and 20 of the baskets 3a–3c are first and second free spaces 21 and 22, opposite to each other.

Advantageously, appropriate means (19a, 20a, 23) are provided for causing at least a major portion of the gaseous phase to flow into the column 1 through at least one basket 3a –3c, from the first free space 21 to the second free space, or the other way round.

In FIG. 5, the parts of the column 1 which are structurally and functionally equivalent to those shown in the previous figures are indicated by the same reference numbers and will be no further described.

According to this embodiment of the invention, the liquid phase is caused to flow through the filler 4 from above downward in a substantially axial direction, whereas the gaseous phase advantageously flows through the filler 4 in a substantially crosswise direction from bottom to top.

In other words, the gaseous phase is moved from one side of the basket 3a–3c to the other in an essentially oblique flow wherein the horizontal component prevails.

Preferably, as shown in FIGS. 5 and 6, the shell 2 is substantially cylindrical in shape, and the cross-sectional shape of the free spaces 21 and 22 is a circular sector. In this way, the space available inside the column 1 can be best utilized, and roomy baskets 3a –3c for containing the filler 4, as well as sufficiently broad free spaces 21 and 22 to allow the gaseous phase to flow through without undue frictional drag, can be provided.

Similarly as the previous examples, here again at least one of the sidewalls 19 and 20, preferably both, of the basket 3a –3c comprises a gas-impermeable portion 19a, respectively 20a, of predetermined length at a top end thereof, which is effective to deflect the gaseous phase flow horizontally.

In addition, the column 1 advantageously includes gas-impermeable means 23 for closing the free spaces 21 and 22, disposed at the first and at the second free space 21 and 22.

For the purpose, the closure means comprise a gas-impermeable baffle 23 located at a top end of the first free space 21, and a gas-impermeable baffle 23 located at a bottom end of the second free space 22.

In an alternative embodiment, not shown, the gas-impermeable baffles 23 are located at a bottom end of the first free space 21 and at a top end of the second free space 22, respectively.

In the example of FIG. 5, these baffles 23 have a circular-sector shape.

The baffles 23 are advantageously effective to induce a crossflow of the gaseous phase through the filler 4 from the first free space 21 to the second 22 and/or the other way round, while preventing the gaseous phase from undesirably bypassing the baskets 3a–3c.

As concerns the length of the gas-impermeable portion 19a and 20a of the sidewalls 19 and 20, as well as the number, the arrangement and the length of the baskets 3a–3c inside the column 1, the same characteristics and advantages apply as have been discussed above in relation to the previous figures.

Just as example, it is noted that in column 1 of FIG. 5 three catalytic baskets 3a–3c are coaxially arranged, loaded with the filler 4, superimposed and contiguous with one another, with the top basket 3c being longer than the underlying baskets 3a–3b.

A perforated bottom 13 is provided in each basket 3a–3c for passing the liquid phase and a minor portion of the gaseous phase between successive baskets. In addition, the baskets is 3a–3c are open ended at the top.

As a result, in the example of FIG. 5, the gaseous phase is advantageously allowed to flow through the baskets 3a–3c in a mixed crosswise and axial direction.

Alternatively, in an embodiment not shown in the drawings, the baskets 3a and 3c may be fitted with respective gas-impermeable covers at their top ends, so that a true crosswise flow of the gaseous phase can be provided through the filler 4.

Also within the scope of this invention is a column 1 comprising some of the baskets flown by the gaseous phase in a substantially crosswise direction and others of the baskets flown in a mixed crosswise and axial direction.

The baskets 3a–3c may advantageously be disposed in a mutually spaced-apart relationship inside the column 1. Also, suitable means may be provided between successive baskets 3a–3c to collect and re-distribute the liquid phase.

In the example of FIG. 5, these means comprise the perforated bottoms 13 provided at the bottom ends of the baskets 3a–3c, which is suitably sized to deflect the gaseous phase flow crosswise and/or to collect and re-distribute the liquid phase flowing between successive baskets.

Alternatively, the column 1 could advantageously comprise, instead of the baskets 3a–3c, a single basket 3 divided into a plurality of contiguously superimposed zones, not shown, which can be likened in every respect to the above-described baskets 3a–3c and have the same characteristics and advantages. Of course, no perforated bottoms 13 or gas-impermeable covers would be provided between such contiguous zones.

A column 1 could also be arranged to incorporate a plurality of baskets 3a–3c, with at least one of the baskets being divided into the aforesaid plurality of zones.

According to an embodiment, not shown but particularly advantageous, of this invention, a substantially radial or crosswise flow of the gaseous phase can be provided through a column 1 of the type described in relation to FIG. 3 or 5, by replacing the gas-impermeable covers with gas-permeable perforated covers, and advantageously exploiting the hydrostatic liquid head that forms at such perforated covers to stop the gaseous phase from flowing axially through the basket.

In other words, the liquid phase—which is caused to flow from above downward through the column 1—upon leaving one basket, collects at the perforated cover of the next basket, and before being re-distributed and going through this next basket, forms a horizontal liquid layer that cannot be penetrated by the gaseous phase, so that the gaseous phase will be obliged to flow in a crosswise or radial direction.

The present invention is not limited by a specific type of filler 4, and any filler types may be used inside the column 1, including texturized or random types. Advantageously, fillers 4 of different type may be interposed between baskets or between zones of one basket, so that the gaseous phase flow rate, and the mass transfer between the phases flowing through the column 1, can be controlled or modified.

The filler 4 may be made of inert material with respect to the flowing liquid and gaseous phases or it can be a suitable catalyst, or mixtures thereof. In case a catalyst is used in the column 1, then chemical reactions may take place in addition to the mass transfer between the phases.

As brought out by the embodiments described in relation to FIGS. 1–6, according to the process of the present invention for effecting mass transfer between a liquid phase and a gaseous phase inside a filled-type column 1 comprising an external shell 2 which accommodates at least one basket 3 for containing the filler 4 wherethrough such phases are caused to flow in countercurrent, the gaseous phase is advantageously fed into said at least one basket 3 through a gas-permeable surface (9, 10, 19, 20) thereof which is larger than the basket cross-section.

Preferably, this process for effecting mass transfer between a liquid phase and a gaseous phase is carried out within a filled-type column 1 comprising an external shell 2 which accommodates at least one basket 3 for containing the filler 4 and having a smaller cross-section than the cross-section of the shell 2, and comprises the steps of feeding (means 5 and 6) the liquid and gaseous phases into the filled-type column 1, causing the liquid phase to flow through said at least one basket 3 in a substantially axial direction, causing the gaseous phase to flow through said at least one basket 3 in a prevailing radial direction (means 9a, 10a, 14, 14, 19a, 20a, 23), and extracting (means 7 and 8) the liquid and gaseous phases from the filled-type column 1.

As previously described, a reduction in the pressure drop of the gaseous phase flowing through the filler 4 can be provided by the present process, whereby optimum flow rates and velocities can be achieved for that phase (and for the liquid phase) effective to augment the mass transfer between the liquid phase and the gaseous phase.

Additionally thereto, it has been found unexpectedly that by causing the gaseous phase to flow mainly radially through the filler 4, superior efficiency can be achieved for the mass transfer since the driving force which is responsible for such transfer is positively acted upon.

The operating conditions (such as pressure and temperature) of the present process may be changed within broad limits to suit the types of fluids to be processed and any chemical operations to be carried out.

The present invention can also be advantageously applied in columns having both plates and filler containing baskets The column shown in FIGS. 1, 3 and 5 may be a brand new one, or alternatively be—according to an advantageous and preferred aspect of this invention—a pre-existing column of the filled or plates type retrofitted for carrying out mass transfer between a liquid phase and a gaseous phase.

Advantageously, the method for retrofitting such a column would comprise the step of providing within the same at least a basket 3 for containing a filler 4 which has a gas-permeable surface, for passing the gaseous phase, which is larger than its cross-section.

In particular, the retrofitting method according to this invention is characterized in that it comprises the steps of providing, inside the pre-existing column, at least one basket 3 for containing the filler 4 which has a smaller cross-section than the column cross-section and has S opposite gas-permeable sidewalls 9, 10, 19, 20, and of providing, inside the column, means 9a, 10a, 14, 15, 19a, 20a, 23 for causing the gaseous phase to flow through said at least one basket in a prevailing radial direction.

To obtain a column 1 of the same type as described in relation to FIG. 1 or 3, this retrofitting method advantageously comprises the steps of providing at least one annular basket 3 for containing the filler 4 disposed coaxially within the column 1, which basket 3 has opposite cylindrical gas-permeable inner and outer walls, 9 and 10, defining a first free space 11 between an inner wall 2a of the column 1 and the outer wall 10 of the basket 3, and defining a second free space 12 formed inwardly of the inner wall 9 of the basket 3, and providing means 9a, 10, 14 and 15 for causing at least a major portion of the gaseous phase to flow through said at least one basket 3, from the first free space 11 to the second free space 12 or the other way round.

To obtain a column 1 of the type described in relation to FIG. 5, the method advantageously comprises the steps of providing at least one basket 3 for containing the filler 4 disposed coaxially within the column 1, which basket 3 has opposite, preferably plane, gas-permeable sidewalls 19 and 20 defining a first and a second free space 21 and 22 located opposite to each other between an inner wall 2a of the column 1 and the sidewalls 19–20 of the basket 3, and providing means 19a, 20a, 23 for causing said at least one major portion of the gaseous phase to flow through said at least one basket from the first free space 21 to the second free space 22 or the other way round.

Thanks to the present method for retrofitting pre-existing columns for effecting mass transfer between a liquid phase and a gaseous phase, it is advantageously possible to achieve a significant increase in the column capacity, and a reduction in energy consumption, because the column once modernized can operate more effectively at much larger flow rates of the liquid and gaseous phases.

Moreover, in accordance with further embodiments of the retrofitting method according to the present invention, additional means or features can be advantageously provided, as defined in dependent claims 32–37 and 39–44 appended hereto.

Further structural and processing advantages accruing from the present retrofitting method can be inferred from the previous description of FIGS. 1–6.

It can be appreciated that, in implementing the retrofitting method according to the invention, at least some of the constructional elements originally included in the column would have to be removed in a preliminary step, it being possible to re-use such elements, for example, to provide bottoms or covers for the new filler-containing baskets.

From the foregoing description emerge clearly the numerous advantages achieved by the present invention; in particular, it is obtained a process for effecting highly efficient mass transfer between a liquid phase and a gaseous phase, in a simple and reliable manner, at low investment and operating costs, and with low energy consumption.

What is claimed is:

1. Process for effecting mass transfer between a liquid phase and a gaseous phase within a filled-type column which comprises an external shell accommodating at least one filler-containing basket whose cross-section is smaller than the cross-section of said shell, said process comprising the steps of:

feeding said liquid phase and gaseous phase into said filled-type column;

causing the liquid phase to flow through said at least one basket in a substantially axial direction;

causing the gaseous phase to flow through said at least one basket in a prevailing radial direction by making the gaseous phase to flow across gas-permeable portions of opposite sidewalls of said basket, at least one of said sidewalls having a gas-impermeable top portion;

extracting said liquid phase and gaseous phase from said filled-type column.

2. Process according to claim 1, characterized in that said gaseous phase is caused to flow through said at least one basket in a substantially radial, axial-radial, or crosswise direction.

3. Process according to claim 1, characterized in that said liquid phase and said gaseous phase are caused to flow in said at least one basket through a plurality of contiguously superimposed zones.

4. Process according to claim 3, characterized in that said gaseous phase is caused to flow through at least one -of said zones in a prevailing radial direction by making the gaseous phase to flow across gas-permeable portions of opposite sidewalls of said zone, at least one of said sidewalls having a gas-impermeable top portion.

5. Process according to claim 1, characterized in that said liquid phase and said gaseous phase are caused to flow in a direction substantially axial and prevailing radial respectively, through a plurality of superimposed filler-containing baskets.

6. Process according to claim 5, characterized in that it further comprises the step of:

collecting and re-distributing said liquid phase between successive baskets.

7. Process according to claim 5, characterized in that it further comprises the step of:

subjecting at least a portion of said gaseous phase to an indirect heat exchange while said gaseous phase is being flowed from one zone to the next, respectively from one basket to the next.

\* \* \* \* \*